Oct. 28, 1924.  
H. M. PFLAGER  
1,513,343  
MOTOR TRUCK  
Filed June 17, 1922   2 Sheets-Sheet 1

Inventor.  
HARRY M. PFLAGER.  
By J. R. Cornwall  
Atty.

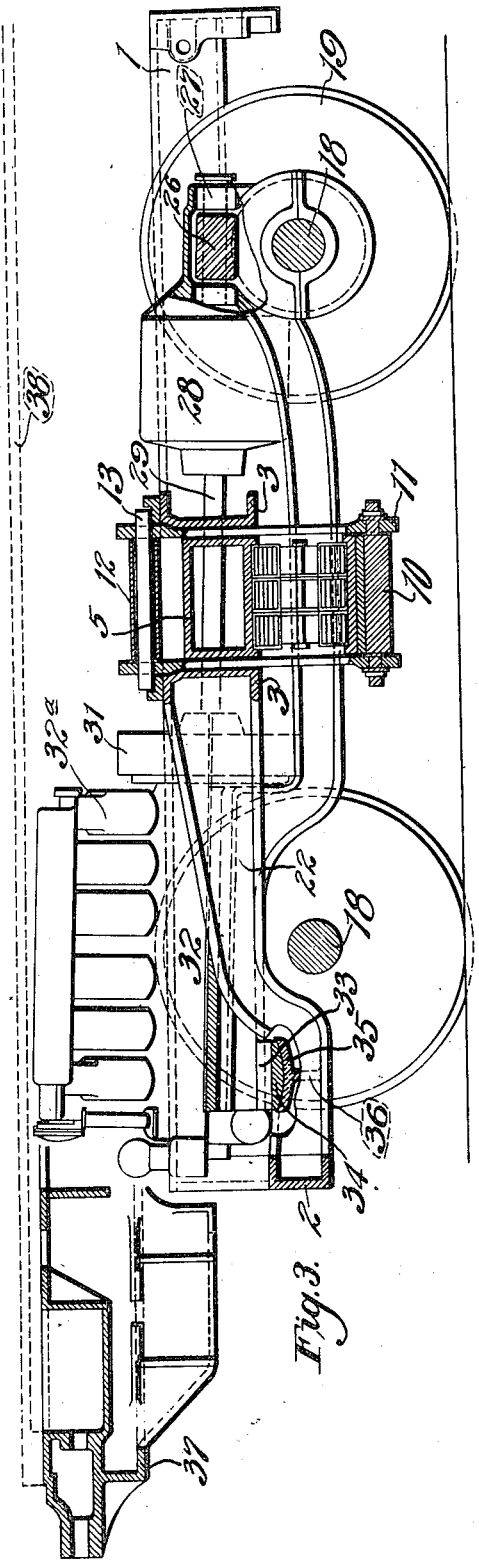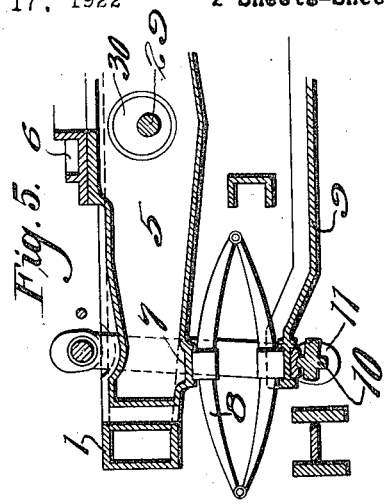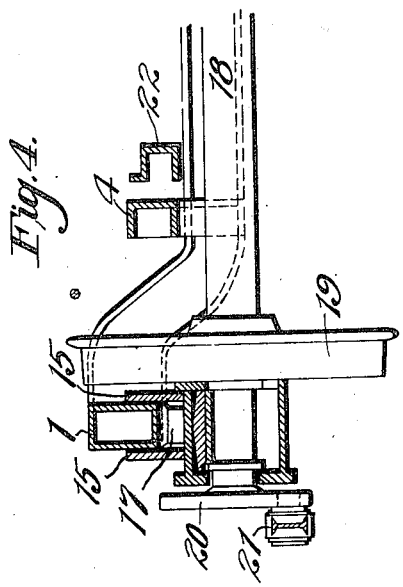

Patented Oct. 28, 1924.

1,513,343

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

MOTOR TRUCK.

Application filed June 17, 1922. Serial No. 569,142.

*To all whom it may concern:*

Be it known that I, HARRY M. PFLAGER, a citizen of the United States, residing at the city of St. Louis and State of Missouri, have invented a certain new and useful Improvement in Motor Trucks, of which the following is a full, clear, and exact description, such as will enable others skilled in the art to which it appertains to make and use the same, reference being had to the accompanying drawings forming part of this application, in which,—

Figure 3 is a sectional view on the line 3—3 of Figure 1.

Figure 4 is a sectional view on line 4—4 of Figure 1.

Figure 5 is a sectional view on line 5—5 of Figure 1.

Figure 1:
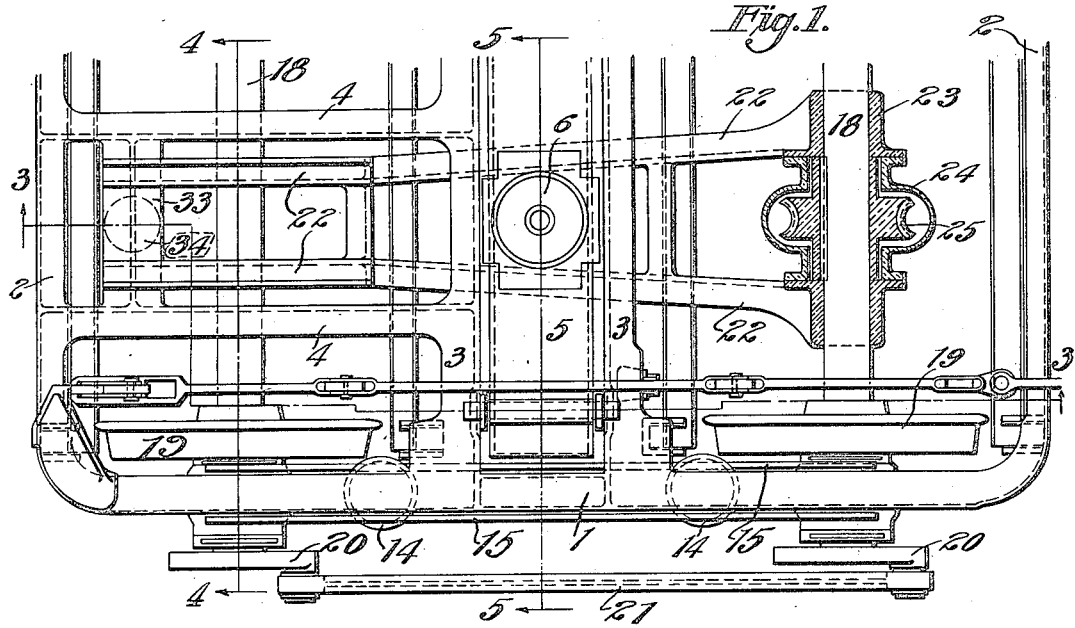
Figure 1 is a partial top plan view of my improved motor truck.
Figure 2:
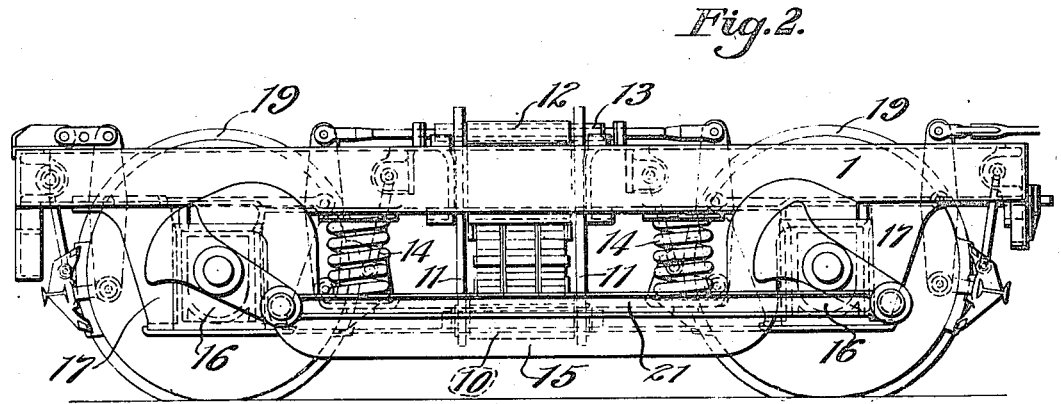
Figure 2 is a side elevational view of the truck.

This invention relates to a new and useful improvement in motor trucks, the object being to construct a motor truck frame and engine mount of cast steel, the latter having a three-point support, i. e., two bearings on the driver axle and one bearing on the truck frame so that the engine mount is free to rise and fall at its axle end and to rotate about a longitudinal center, and to accommodate itself to the movements of the driver axle.

In the particular type of truck shown, the axle bearings are located outside of the wheels, the axles extending through the journal boxes and having cranks on their outer ends connected on each side of the truck by connecting rods. The truck is equipped with a conventional type of internal combustion engine with the usual friction clutch and selective gear shift, whereby one axle is driven, and by the connecting rods the other axle is likewise driven. The type of motor employed may be of any commercial type and preferably is capable of developing from three to six hundred horsepower, depending upon the grades encountered and the load to be hauled.

In practice, there is usually a truck under each end of the car, and each of these trucks may be motor-equipped with controlling means therefor extending through the platform of the car and into a vestibule or cab located at the end or ends of the car. Each car thus becomes a self-contained motor driven unit and may be employed on side, branch and tap lines, as they are sometimes called, in hauling or delivering freight to the main lines. Being of standard gauge and having standard equipment, such a motor car can be coupled to a train on the main line for a long haul. The motor car, of course, will take care of the shorter hauls, and by replenishing the liquid fuel, may make hauls of greater or less distance.

I have illustrated an internal combustion engine as a form of motive power used, but it is obvious that other types of motors could be employed. Where the road is electrified, electric motors could be used.

In the drawings, the truck frame is shown as being made of a single casting, preferably steel, in which 1 indicates the side members, 2 the end members and 3 the transom members. The side members are preferably box-shaped in cross section, as shown in Figure 4, while the end and transom members are substantially channel shaped (see Figure 3), said end and transom members being provided with perforated lugs for the attachment of the brake rigging.

4 are channel-shaped longitudinally disposed members extending from one of the end members 2 to one of the channel members 3. 5 indicates the bolster having the usual center bearing 6, said bolster having spring seats 7 near each end resting upon springs 8, shown in this instance as elliptic springs. Springs 8 rest upon spring plank 9, which is in turn supported by the cross-member 10 of supporting links 11. These supporting links (see Figure 3) are spaced apart by a sleeve 12 at their upper ends through which passes a pin 13, the end of said pin resting in bearings on the upper faces of transoms 3.

14 indicate frame supporting springs resting upon spaced equalizer bars 15, the ends of said bars being goose-neck in shape and supported by the journal boxes 16. These journal boxes are arranged between pedestal jaws 17 extending downwardly from the side frame members 1 and preferably the equalizer bars 15 are arranged on each side of the pedestal jaws, as shown in Figure 4.

18 indicates the wheel axles and 19 the wheels. The axle 18 extends through the journal box and is provided with a counterweighted crank on each end, the pins of which cranks are connected together by a connecting rod 21.

22 indicates a frame member having bearings 23 at one end for receiving one of the axles 18. These bearing members 23 are spaced apart by means of a gear casing 24, said gear casing enclosing a worm gear 25 splined to axle 18. 26 indicates a worm (see Figure 3) for driving gear 25, said worm being mounted on a shaft 27 having a bearing in casing 28 which houses the transmission gear. 29 is the motor driven shaft for the transmission, which shaft (see Figure 5) passes through an opening 30 in the bolster 5 and registering openings in transom 3, whereby said shaft and bolster are free to move independently of each other. Shaft 29 may carry a balance wheel 31.

32 indicates an engine casing having a battery of cylinders 32ª and its usual parts. This engine casing rests upon and is supported by the end of frame 22, and, preferably, immediately over one of the axles 18. Frame 22 is provided with a cross-member 33 having a rocker bearing 34 on its lower face, which rocker bearing co-operates with a rocker seat 35 on a cross-member 36 bridging the longitudinal members 4, before mentioned.

By arranging the free end of frame 22, that is, the end of frame 22 which is not mounted on the axle 18, between the members 4 of the truck frame, and arranging the motor on said frame between said truck frame members, it is obvious that said truck frame members constitute limit stops preventing accidental displacement of the parts when the truck is traveling at high speed around a curve. Furthermore, the rocking bearing readily accommodates the tilting movement of the axle on which the frame 22 is mounted, as well as permitting an independent tilting movement of the truck side frames. The axle 18 on which the frame 22 is mounted may also swing horizontally to the extent of the play allowed by its associate parts, without disturbing the alinement and proper mesh between the motor, the transmission gear, and the main driving gear for the axle.

37 indicates part of the cast steel platform of the car body upon which is arranged the floor 38 of a car. These parts are illustrated merely to show their relative location with respect to my improved truck and its associate parts.

What I claim is:

1. A truck frame consisting of a single steel casting having side, end and transom members, longitudinally disposed limit-stop members between an end and a transom member, and a motor-supporting frame movable between said limit stop members.

2. A truck frame having side, end and transom members, pedestal jaws and boxes, axles mounted in said boxes, a motor supporting frame having a bearing on one axle, and extending beyond the other axle and being supported by said truck frame at said last-mentioned extremity.

3. In combination with a truck frame, its wheels and axles, a bolster yieldingly carried by said frame, a motor supporting frame pivotally mounted on an axle to one side of said bolster, said motor frame being supported by said truck frame on the opposite side of said bolster.

4. In combination with a truck frame, its wheels and axles, a bolster having vertical movement relative to said frame, a motor supporting frame pivotally mounted on one of said axles and extending under said bolster and over and beyond the other axle, and a support on the truck frame for the extended end of said motor frame.

5. In combination with a truck frame, its wheels and axles, a motor frame pivotally mounted on one of said axles and extending over and beyond the other axle, and a rocker-bearing support on the truck frame, curved longitudinally of said truck, for the extended end of said motor frame.

6. In combination with a truck frame, its wheels and axles, a spring plank and a body supporting center bearing carried thereby, a motor supporting frame pivotally mounted on one of said axles and extending beyond said center bearing, and a bearing on the truck frame for the extended end of said motor frame.

7. In combination with a one-piece cast truck frame, its wheels and axles, a motor-supporting frame formed of a one piece casting having a two-point bearing on one of said axles, said frame bridging the space between said axles and having an integral projection bearing on said truck frame beyond the other axle.

8. In combination with a truck frame, its wheels and axles, a motor-supporting frame having a two-point bearing on one of said axles, said frame bridging the space between said axles and having a bearing on said truck frame beyond the other axle, a motor carried by said frame, and limit-stops on the truck frame for co-operating with said motor frame.

9. In combination with a truck frame, its wheels and axles, a motor-supporting frame having a bifurcated end bearing on one of said axles, a gear-casing on said axle, within said bifurcation, said frame extending beyond the other axle and at its opposite end having a rocker bearing engagement with said truck frame, a motor mounted on said motor frame, and a motor driven shaft operated by said motor and extending into said gear casing.

10. In combination with a truck frame, its wheels and axles, a motor-supporting frame pivotally mounted on one of said axles and extending over and beyond the other axle, a bearing integral with the truck frame for said extended end, a motor mounted on said extended end, and a motor-driven shaft extending from said motor to the axle on which said frame is pivoted.

11. In combination with a truck frame, its wheels and axles, a motor-supporting frame pivotally mounted on one of said axles and extending over and beyond the other axle, a bearing on the truck frame for said extended end, a motor mounted on said extended end, and a motor-driven shaft extending from said motor to the axle, on which said frame is pivoted, said truck frame being provided with enlarged openings through which said motor driven shaft freely passes.

12. In a truck, a frame consisting of a single steel casting having side, end and transom members, wheeled axles, and a motor supporting frame mounted on one of said axles extending over the other of said axles and movable transversely of the latter.

13. In a truck, a frame having side, end and transom members, wheeled axles, and a motor supporting frame having a bearing on one of said axles extending beyond the other axle and provided with a ball and socket bearing at said last mentioned extension.

14. In a truck including wheels and axles, a one-piece frame casting including sides, ends, intermediate transoms and spaced parallel longitudinal elements extending between one of said transoms and one of said ends, a cross member between said elements, a motor truck frame supported at one end on said cross member and at its other end upon one of the truck axles.

15. In a truck, a truck frame, wheeled axles, a bolster between said axles, a motor frame supported on one of said axles and on the opposite end of said truck frame, a motor thereon, and a drive shaft extending from said motor through said bolster.

16. In a truck, a truck frame including ends and spaced transverse transoms between said ends, wheeled axles, a bolster between said transoms, a motor frame extending on opposite sides of said bolster and transoms, a motor mounted on one end of said motor frame, and a drive shaft extending through said bolster and transoms to an axle on the other side of said bolster and transom.

17. In combination with a truck frame, its wheels and axles, a motor supporting frame having a two-point bearing on one of said axles, said frame bridging the space between the axles, a motor carried by said frame, and limit stops on the truck frame for cooperating with said motor frame.

In testimony whereof I hereunto affix my signature this 12th day of June, 1922.

H. M. PFLAGER.